United States Patent
Deng

(10) Patent No.: US 11,489,607 B2
(45) Date of Patent: *Nov. 1, 2022

(54) METHODS AND APPARATUS FOR CONFIGURING A FLEX ETHERNET NODE

(71) Applicant: Telefonaktiebolaget LM Ericsson (publ), Stockholm (SE)

(72) Inventor: Jun Deng, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/326,814

(22) Filed: May 21, 2021

(65) Prior Publication Data

US 2021/0281344 A1 Sep. 9, 2021

Related U.S. Application Data

(63) Continuation of application No. 16/954,823, filed as application No. PCT/CN2017/117877 on Dec. 22, 2017, now Pat. No. 11,018,792.

(51) Int. Cl.
*H04J 3/16* (2006.01)
*H04J 14/08* (2006.01)

(52) U.S. Cl.
CPC ............ *H04J 3/1694* (2013.01); *H04J 14/08* (2013.01)

(58) Field of Classification Search
CPC .............................. H04J 3/1694; H04J 14/08
USPC .......................................................... 398/48
See application file for complete search history.

(56) References Cited

U.S. PATENT DOCUMENTS

| 11,018,792 | B2* | 5/2021 | Deng ................. H04J 3/1694 |
| 2017/0005742 | A1 | 1/2017 | Gareau et al. |
| 2017/0005901 | A1 | 1/2017 | Gareau |
| 2017/0093757 | A1 | 3/2017 | Gareau et al. |
| 2017/0230338 | A1 | 8/2017 | Loprieno et al. |
| 2018/0013511 | A1* | 1/2018 | Hussain ............. H04J 14/0204 |
| 2018/0159785 | A1 | 6/2018 | Wu et al. |
| 2019/0342022 | A1 | 11/2019 | Zhou et al. |
| 2019/0372717 | A1* | 12/2019 | Zhang ................. H04L 1/0083 |
| 2020/0067827 | A1 | 2/2020 | Mei et al. |
| 2020/0112383 | A1 | 4/2020 | Liu |

(Continued)

FOREIGN PATENT DOCUMENTS

| CN | 106357421 A | 1/2017 |
| CN | 106411454 A | 2/2017 |

(Continued)

OTHER PUBLICATIONS

Trowbridge, Stephen J., et al., "Flex Ethernet Implementation Agreement 1.0", Optical Internetworking Forum; IAOIF-FLEXE-01.0; Working Group: Physical and Link Layer, Mar. 2016, pp. 1-31.

*Primary Examiner* — Dalzid E Singh
(74) *Attorney, Agent, or Firm* — Murphy, Bilak & Miller, PLLC

(57) ABSTRACT

Various embodiments are disclosed for processing Flex Ethernet (FlexE) communications. Embodiments include a method of configuring a first FlexE node includes the first FlexE node configuring sending of second data, by the first FlexE node to a second FlexE node, using configuration specified in first data received by the first FlexE node. Other embodiments include apparatus arranged for configuring FlexE nodes, FlexE nodes comprising such apparatus, and computer-readable media.

20 Claims, 4 Drawing Sheets

(56) References Cited

U.S. PATENT DOCUMENTS

| | | | | |
|---|---|---|---|---|
| 2020/0228458 A1* | 7/2020 | Huang | ................ | H04J 3/1658 |
| 2021/0218521 A1* | 7/2021 | Du | ..................... | H04L 5/0044 |
| 2021/0359934 A1* | 11/2021 | Mei | .................... | H04J 3/1658 |

FOREIGN PATENT DOCUMENTS

| | | | |
|---|---|---|---|
| CN | 106803785 | A | 6/2017 |
| CN | 106803814 | A | 6/2017 |
| CN | 107437973 | A | 12/2017 |
| EP | 3113502 | A1 | 1/2017 |
| JP | 2008148039 | A | 6/2008 |
| WO | 2007014319 | A2 | 2/2007 |
| WO | 2017016379 | A1 | 2/2017 |
| WO | 2017070851 | A1 | 5/2017 |

* cited by examiner

METHODS AND APPARATUS FOR CONFIGURING A FLEX ETHERNET NODE

CROSS-REFERENCE TO RELATED APPLICATIONS

This application is a continuation of, and claims the benefit of priority from, U.S. application Ser. No. 16/954,823 filed on Jun. 17, 2020, which is a national-stage application claiming priority to International Appl. No. PCT/CN2017/117877 filed on Dec. 22, 2017. The entire disclosures of the above-mentioned applications are incorporated herein by reference for all purposes.

TECHNICAL FIELD

Examples of the present disclosure relate to methods and apparatus for configuring a Flex Ethernet (FlexE) node.

BACKGROUND

The Flexible Ethernet (FlexE) Implementation Agreement 01.0 defined by the Optical Internetworking Forum (OIF), which is incorporated herein by reference, provides a mechanism for supporting a variety of Ethernet MAC rates that may or may not correspond to any existing Ethernet PHY rate. This includes MAC rates that are both greater than (through bonding) and less than (through sub-rate and channelization) the Ethernet PHY rates used to carry FlexE. A PHY is an implementation of a physical layer, such as for example an optical communications link or a wireless connection between devices. The Implementation Agreement defines FlexE Client MAC rates of 10, 40, and m×25 Gb/s, and defines that a FlexE Group may comprise 1 to n bonded Ethernet PHYs.

SUMMARY

One aspect of the present disclosure provides a method of configuring a first Flex Ethernet (FlexE) node. The method comprises receiving first data from a second FlexE node in time slots over at least one physical layer connection, the first data including overhead identifying assignments of the time slots to one or more client flows in the first data. The method also comprises assigning time slots for transmission of second data to the second FlexE node based on the assignments of time slots in which the first data is received.

Another aspect of the present disclosure provides apparatus for configuring a first Flex Ethernet (FlexE) node. The apparatus comprises a processing circuitry and a memory. The memory contains instructions executable by the processing circuitry such that the apparatus is operable to receive first data from a second FlexE node in time slots over at least one physical layer connection, the first data including overhead identifying assignments of the time slots to one or more client flows in the first data, and assign time slots for transmission of second data to the second FlexE node based on the assignments of time slots in which the first data is received.

A further aspect of the present disclosure comprises apparatus for configuring a first Flex Ethernet (FlexE) node. The apparatus comprises a receiving module configured to receive first data from a second FlexE node in time slots over at least one physical layer connection, the first data including overhead identifying assignments of the time slots to one or more client flows in the first data. The apparatus also comprises an assigning module configured to assign time slots for transmission of second data to the second FlexE node based on the assignments of time slots in which the first data is received.

Yet another aspect of the present disclosure comprises a FlexE node comprising apparatus as disclosed above.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, programmable logic arrays, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
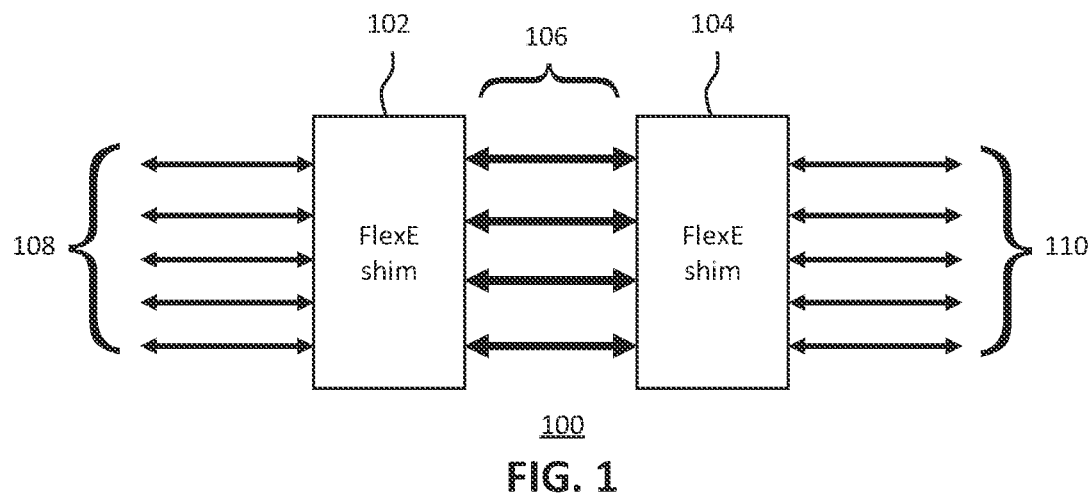
FIG. 1 is a schematic illustration of an example of a FlexE communications system.

FIG. 1 shows an example of a FlexE communications system 100. The system 100 includes a first FlexE shim 102 and a second FlexE shim 104. The FlexE shims 102 and 104 are connected by one or more communication links 106 or PHYs, collectively referred to as a FlexE group. According to the current FlexE standard (Implementation Agreement), a FlexE group may contain between 1 and 254 PHYs.

The first FlexE shim 102 is connected to a number of Ethernet clients 108. The second FlexE shim 10 is connected to the same number of Ethernet clients 110. A client 108 connected to the FlexE shim 102 has a corresponding client 110 connected to the FlexE shim 104, such that the clients may communicate via the shims and over the FlexE group 106.

Figure 2:
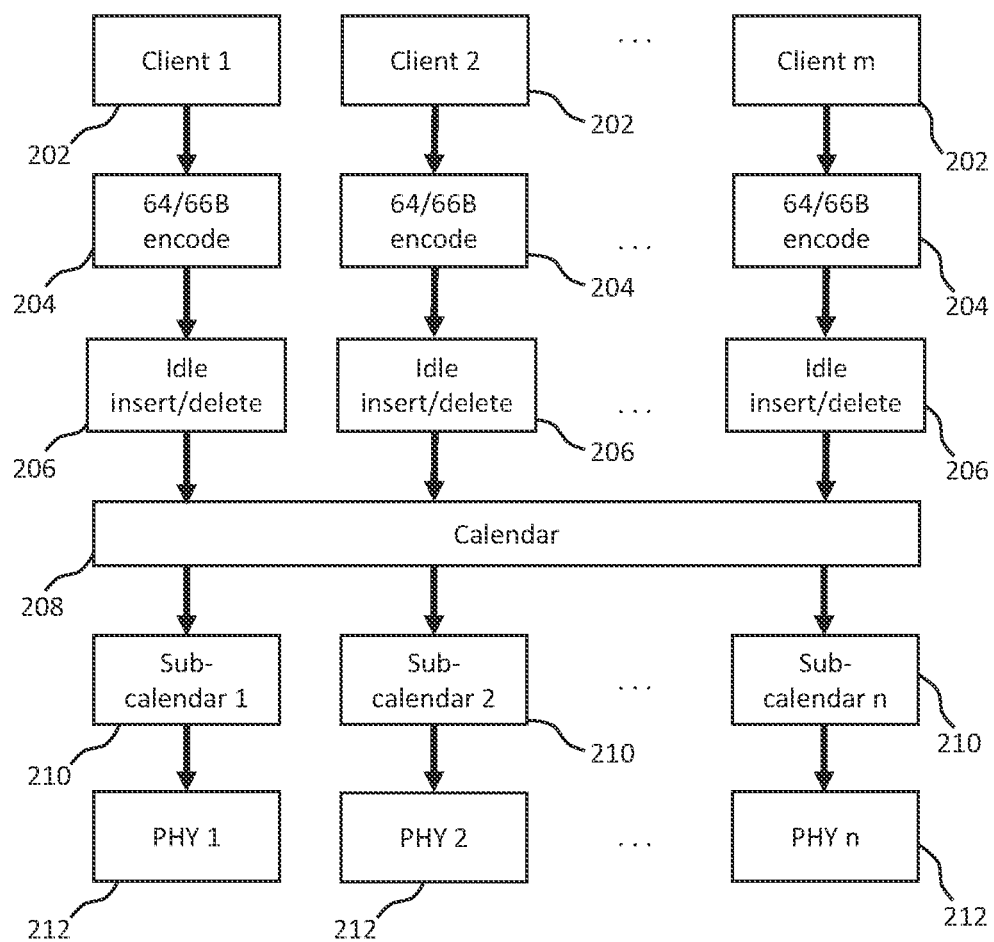
FIG. 2 is a schematic illustration of an example of functions of a FlexE multiplexer.

FIG. 2 shows an example of functions of a FlexE multiplexer (FlexE mux), one or more of which may be implemented by a FlexE shim. A plurality of FlexE clients 202 wish to transmit data to corresponding clients over a PHY or a FlexE group. Each client 202 provides data in the form of 64 bit blocks to a respective 64/66B encode block 204. Each 64/66B encode block 204 encodes 64-bit blocks of data from the respective client as 66-bit blocks, also known as Physical Coding Sublayer (PCS) blocks, and provides the 66-bit blocks to a respective idle insert/delete block 206. The idle insert/delete blocks insert 'idle' control blocks into the data stream when there is no data to transmit from the respective client, and/or when the block rate into calendar function 208 is higher than that provided by the idle insert/delete block 204. The output of each idle insert/delete block 206 is in the form of a stream of 66-bit blocks and is provided to calendar function 208.

The calendar function 208 arranges 66-bit blocks from each idle insert/delete block for scheduling for transmission on the PHYs of a FlexE group. The calendar function provides a respective sub-calendar 210 for each PHY 212 of n PHYs in the FlexE group. Each sub-calendar 210 comprises 66-bit blocks for transmission on a respective PHY 212 of the FlexE group.

The calendar has a granularity of 5 Gbps, and has a length of 20 slots per 100 Gbps of FlexE group capacity. Therefore, for example, where a FlexE group is made up of n 100 Gbps PHYs, the length of the calendar is 20n slots. Each slot carries a 66-bit block. Two calendar configurations are supported: an "A" and a "B" calendar configuration. At any given time, one of the calendar configurations is used for mapping data clocks from the FlexE clients into the calendar. The two calendar configurations are provided to facilitate reconfiguration.

The sub-calendar for a PHY includes a repeating assignment of twenty 66-bit blocks to the FlexE client flows (data from FlexE clients) that are being carried on that PHY. The slots are numbered 0-19. The blocks transmitted on each PHY also include overhead blocks. One 66-bit overhead block is inserted for every 1023 repetitions of the sub-calendar (i.e. after every 1023×20 66-bit data blocks). Eight 66-bit overhead blocks comprise an overhead frame. 32 overhead frames comprise an overhead multiframe.

An overhead multiframe is arranged as follows. The first 66-bit block in an overhead frame in the multiframe has 0×4B in bits 0-7 and 0×5 in bits 32-35. These two values indicate that the block is the first block in an overhead frame. Each overhead frame also indicates the FlexE group number in which the PHY belongs. The second overhead block (transmitted 1023 sub-calendar repetitions later than the first overhead block) carries PHY information, including a PHY map. There can be 254 PHYs combined in a group (with identification 1-254), and each bit in the 256-bit PHY map indicates whether a PHY with that number exists in the FlexE group. Each overhead frame includes eight bits of the PHY map, and so all of the second overhead frame blocks of the 32-frame overhead multiframe transmit the complete PHY map. The second block of the overhead frame also indicates the PHY number (0-255) of the PHY carrying the overhead frame.

The third block in an overhead frame carries the client distribution information, i.e. the client numbers to which each slot in the 20-slot sub-calendar is assigned. There are twenty 5 Gbps slots in a sub-calendar for a 100 Gbps PHY, so twenty of the third overhead frame blocks in an overhead multiframe are used to indicate which client data each slot carries. There are two calendar configurations, "A" and "B", and so the overhead multiframe indicates, for each of the 20 slots, which client has been assigned that slot for both calendar configurations. The overhead frame also indicates which calendar configuration is currently in use. The bit indicating the calendar in use is repeated three times in the frame to counter transmission errors. Blocks four to eight of the overhead frame are currently reserved for management data.

An overhead block contains a Calendar switch Request (CR) bit that can be used by a sending entity (e.g. sending FlexE shim) to send a request to the receiving entity (eg. Receiving FlexE shim) that a calendar configuration (A or B configuration) other than the one currently being used should be used. An overhead block also contains a Calendar switch Acknowledge (CA) bit used to acknowledge the calendar configuration switch in the reverse direction (i.e. the CA bit is in overhead sent over the PHY in the reverse direction).

The first block in an overhead frame can be used to align incoming data, e.g. determine the slot number of frames following the overhead frame, and determine the slot and overhead frame number for subsequent overhead frames.

Figure 3:
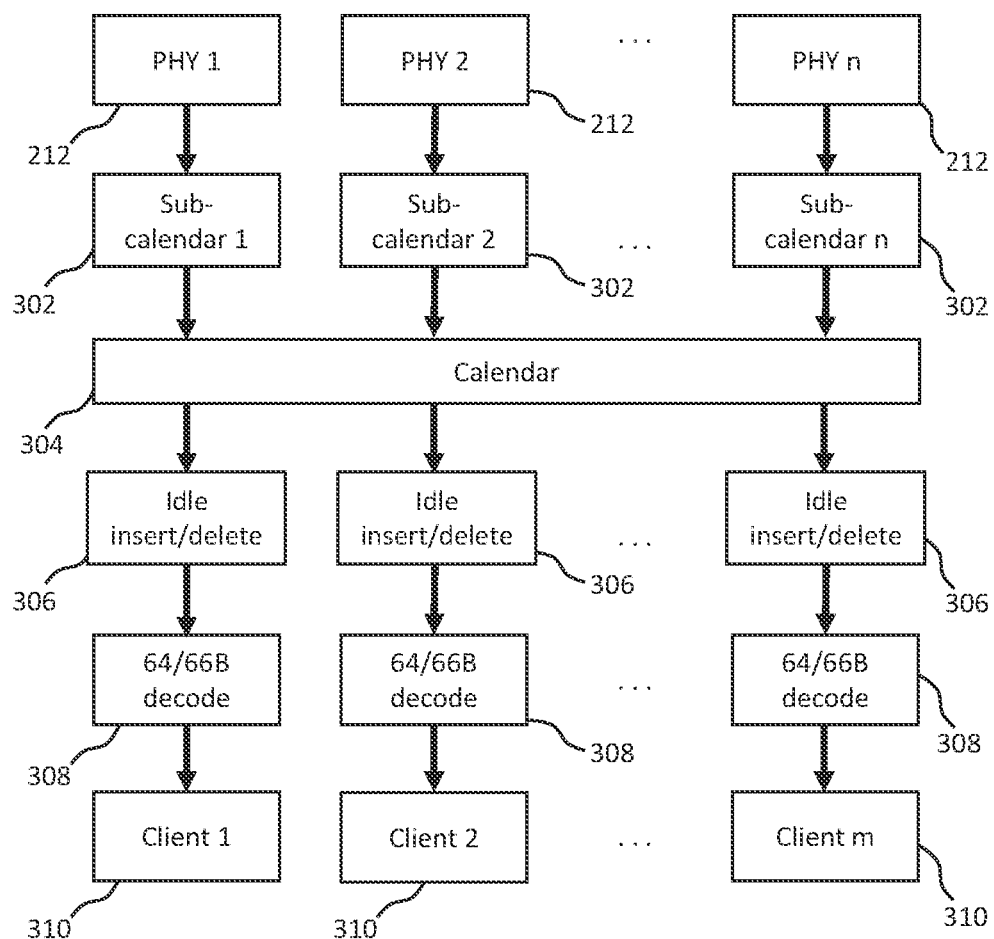
FIG. 3 is a schematic illustration of an example of functions of a FlexE demultiplexer.

FIG. 3 shows an example of functions of a FlexE demultiplexer (FlexE demux), one or more of which may be implemented by a FlexE shim. 66-bit blocks of data are received from each of n PHYs 212 and provided to respective sub-calendars 302. These are arranged into a calendar 304 that may in some implementations be identical to the calendar 208 shown in FIG. 2. The 66-bit blocks from the calendar (not including overhead blocks) are provided to the appropriate idle insert/delete blocks 306, each of which is associated with a client flow for a client. The idle insert/delete blocks may delete idle control blocks from the stream of blocks from the calendar 304. The output of each idle insert/delete block 306 is provided to a respective 64/66B decode block, which decodes the 66-bit blocks into 64-bit data blocks, and provides the 64-bit blocks to the respective one of m clients 310.

Each client 310 is associated with one of the clients 202 shown in FIG. 1, and associated clients communicate in a bi-directional manner. Therefore, for example, a FlexE shim at one end of the PHYs includes a FlexE mux and a demux, and similarly a FlexE shim at the other end of the PHYs also includes a mux and a demux. Associated clients are identified using the same identifier (e.g. client number) in the calendar client distribution information in the overhead going in both directions between the shims.

The information comprising the PHY map and calendar client distribution information (for both calendars) can be used by a FlexE demux to check that the demux is correctly assigning time slots in which data is received to the correct client, and thus to check that the received data is going to the correct client. The information can also be used by the demux to reconfigure the calendar that is not in use (A or B), as the demux can configure the calendar that is not in use using the information in the overhead. The information is sent to the demux in the overhead by a FlexE mux, and may also be determined by the FlexE mux or a system operator.

In some FlexE implementations, the nodes (e.g. shim or mux) at each end of the FlexE group configures its calendar for sending data to the node at the other end of the FlexE group independently of the node at the other end. It is therefore a problem in some FlexE implementations that, for example, an operator must configure the nodes independently, or processing must be implemented at each end to determine the calendar to use. In embodiments disclosed herein, a FlexE node may use the configuration specified in received data to configure the sending of data. For example, where a FlexE node receives data over a FlexE group according to a calendar configuration, the FlexE node may configure its mux to send data back over the FlexE group using a configuration that is based on the configuration for received data. It is therefore an advantage of at least some embodiments disclosed herein that the amount of configuration and/or processing related to configuration for at least one node at an end of one or more physical layer connections (e.g. a FlexE group) is reduced. In some examples, the configuration for sending data is the same as for the received data.

Figure 4A:
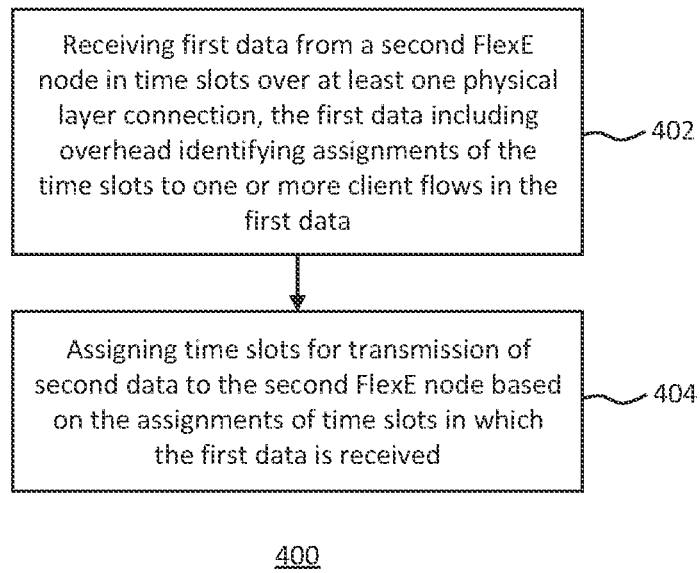
FIG. 4A is a flow chart of an example of configuring a FlexE node.

FIG. 4A shows an example of a method 400 of configuring a first Flex Ethernet (FlexE) node according to embodiments of this disclosure. The method 400 comprises, in step 402, receiving first data from a second FlexE node in time slots over at least one physical layer connection, the first data including overhead identifying assignments of the time slots to one or more client flows in the first data. In some examples, a user or operator may configure the second FlexE node to send the first data using the particular time slot configuration. In other examples, the user or operator may specify the clients and the bandwidth required by the clients, and a node such as the second node may automatically determine an appropriate configuration of PHYs and time slots for transmission of the first data to the first node. However, these are merely examples and any embodiment disclosed herein may use any appropriate manner for determining the time slots for the first data.

The first FlexE node may for example be a FlexE shim or FlexE demux. Similarly, the second FlexE node may be for example a FlexE shim or FlexE mux. The first data may comprise data blocks, such as 66-bit data blocks. The data blocks may in some examples include Ethernet data blocks. For example, the Ethernet data blocks may be 66-bit data blocks specified in FIG. 82-5 of the IEEE Standard for Ethernet, 802.3-2015, the entire contents of which is incorporated herein by reference. The data blocks may also include overhead blocks such as those specified above.

The time slots may be for example a sub-calendar containing data blocks. For example, there may be a configuration of 20 time slots, each time slot being assigned to a respective client such that the data in the time slot should be provided to the respective client. A time slot may carry one or more data blocks, such as one or more 66-bit data blocks. In the 20-slot sub-calendar, there may be one or more time slots assigned to a particular client, and/or one or more time slots may carry an idle block or another control block. The 20 time slots are each given an index 0-19 based on their positions within the 20-slot sub-calendar. The position of the sub-calendar within the first data, and thus the position of the time slots with particular indexes within the first data, can be determined relative to an overhead block or overhead frame in the first data. An overhead block be recognised due to the particular format of overhead blocks, such as for example the format identified above. The 20-slot configuration of time slots (e.g. sub-calendar configuration) can be recurring i.e. repeated multiple times, such as continuously. Therefore, for example, a slot with index k may be assigned to a particular client x, and therefore slot k in each repetition of the sub-calendar in the received data may carry a data block for client x (or an idle or other control block).

Step 404 of the method 400 comprises assigning time slots for transmission of second data to the second FlexE node based on the assignments of time slots in which the first data is received. Therefore, for example, the first FlexE node may not need to be configured to send data independently of the first FlexE node. Instead, it may be configured based on the configuration of the received first data, which may reduce or eliminate for example the need for an operator to configure the first FlexE node manually, or may reduce the amount of processing required by the first FlexE node to configure a calendar for sending the second data to the second FlexE node.

For example, the second data includes one or more additional client flows. Each one of the one or more additional client flows may correspond to a respective one of the one or more client flows from the second node to the first node. Therefore, a client flow in the first data and its corresponding additional client flow in the second data may together comprise a two-way communication path between associated clients at both ends of at least one physical layer connection (e.g. FlexE group). The associated clients may be identified by the same client number, for example as specified in FlexE overhead. In some examples, assigning time slots for transmission of second data to the second FlexE node comprises, for each assignment of a time slot in which the first data is received to one of the one or more client flows, assigning the same time slot for transmission of the second data to the corresponding additional client flow. Where, for example, time slot k in the sub-calendar (e.g. 20-slot repeating sub-calendar) is assigned to client x in the first data, such that time slot k carries data for client x (or idle or control blocks), time slot k is assigned to the corresponding client flow in the second data for transmission to the second FlexE node. In some examples, the time slots may be at the same time, such as for example when overhead blocks in the first data occur at the same time as overhead blocks in the second data, and thus the time slots in the first and second data are aligned. However, in other examples, the time slots are not time-aligned.

Figure 4B:
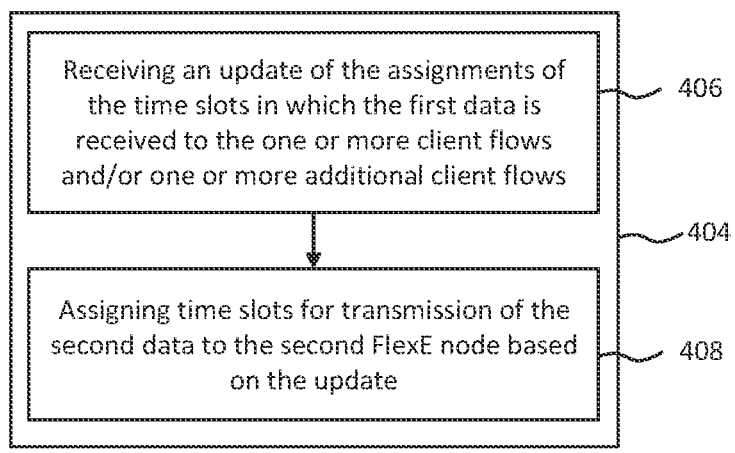
FIG. 4B is a flow chart of an example of assigning time slots for transmission of second data.

In some examples, the first FlexE node may receive a calendar update, as indicated in the overhead within the first data. In such cases, the first FlexE node may update its calendar for sending the second data to the first node based on the updated calendar for received data from the first node. The updated calendar may be for example the "in use" calendar and/or the calendar that is not currently being used (e.g. A or B calendar). FIG. 4B shows an example of steps included in step 404 of FIG. 4A. For example, step 404 of assigning time slots for transmission of second data to the second FlexE node based on the assignments of time slots in which the first data is received may comprise or include a first step 406 of receiving an update of the assignments of the time slots in which the first data is received to the one or more client flows and/or one or more additional client flows, and a second step 408 of assigning time slots for transmission of the second data to the second FlexE node based on the update.

In some examples, the at least one physical layer connection comprises a FlexE group. The FlexE group may include one or more 100 Gbps PHYs. The PHYs may comprise optical PHYs. The time slots in which the first data is received, and also time slots for sending the second data to the second node, may comprise a recurring sub-calendar of 20 time slots, and thus each recurring time slot represents a 5 Gbps data stream.

In some examples, where there are multiple physical layer connections (e.g. PHYs) in a FlexE group, first data may be received over the multiple physical layer connections. Therefore, for example, a time slot assigned to a client flow may be received on a particular PHY. In some examples, the first node may assign the same time slot (e.g. same time slot index) on the same PHY to the same client.

In some examples, the first FlexE node can be configured as a "slave" node that configures its transmission calendar based on information from the second FlexE node, which can be considered as a "master" node which sends the information to the first FlexE node, and may also determine (e.g. decide) the information and thus how the calendar is configured.

In some examples, the second node may determine the configuration of time slots and PHYs in a FlexE group used to transmit the first data to the second node. For example, in such examples, the second node may determine the client (if any) to which each particular time slot on each PHY is assigned. Determination of the configuration by the second node may be advantageous in certain circumstances. For example, the second node may be able to quickly reassign time slots in the failed PHY to other PHYs, and may be able to quickly reassign the time slots in other PHYs to other time slots and/or PHYs. In this way, any impact of the failure may be quickly resolved. In some examples, the FlexE group may be associated with at least one unused PHY to be used if a PHY in the FlexE group experiences a failure. In these examples, the unused PHY may be added to the FlexE group in place of the failed PHY. In some examples, any communications on the failed PHY may be simply assigned to the unused PHY in the same time slots, though more complex reconfiguration across the FlexE group may also occur. In some examples, in the event of reconfiguration by the second node, which may take place more quickly than, for example, reconfiguration by a remote management node, the reconfiguration may be communicated to the first node, for example using FlexE overhead, in the manner disclosed herein and used by the first node for transmissions to the second node (e.g for the second data).

In some examples, ensuring that the traffic distribution in both directions (e.g. for both the first data and the second data) is symmetrical (e.g. the same time slots and PHYs are allocated in both directions to traffic between associated clients) may be advantageous. For example, as well as making configuration simpler as disclosed above, asymmetrical distribution of client traffic may make certain functions such as link protection (e,g, using redundant PHYs) or power saving (e.g. of unused PHYs in the FlexE group) more difficult or unachievable. Furthermore, reconfiguration may me made simpler and therefore faster in the event of a failure, for example a PHY in a FlexE group becoming inoperable, by using a symmetrical configuration. In some examples, any reconfiguration, e.g. by the second node, can be communicated to the other node using FlexE in the manner disclosed herein.

A specific example of initial configuration of a FlexE node will now be described. Embodiments disclosed herein configures the FlexE group and transmissions over the group only on one side of the FlexE group (e.g. in a master node), and the configuration takes effect for transmissions from a node on the other side of the group (e.g. a slave node.) The initial configuration first comprises, for example, configuring a node at one end of the FlexE group as a slave node. Next, in a synchronizing period, the slave node (e.g. a shim, demux or mux in the slave node) received FlexE overhead blocks or frames to discover configuration of received data, such as for example FlexE group number, PHY map, FlexE instance number, client to slot mapping, synchronization channel.

Next, the slave node validates the received configuration, including calculating the consistency of the discovered PHY number and PHY map, by for example comparing multiple instances of the received configuration information. The slave node may determine that it is synchronized with the master node at the other end of the FlexE group when it determines that the discovered configuration information is complete and consistent (e.g. multiple copies of the received configuration information are consistent). Then, the slave node uses the discovered configuration to configure its FlexE shim and send transmissions to the master node using the configuration.

A specific example of a calendar update in a FlexE node will now be described. During operation of the FlexE nodes, i.e. when the nodes are sending data to each other based on a calendar of data sent from the second node to the first node, the mapping of data from the second node to the first node (e.g. the calendar) can be modified by adding or removing a client or adjusting time slot mapping of one or more clients. This may be achieved using a FlexE calendar switch. First, the slave node receives a Calendar switch Request (CR) indication from the master node. This is indicated in overhead received from the master node. For example, the CR bit in one or more FlexE overhead blocks from the master node is set. The CR indication indicates that there is a change in the standby calendar (i.e. the calendar that is not currently in use, the A or B calendar). The slave node then reconfigures its standby calendar for transmission of traffic from slave to master node based on the update to the calendar for transmissions from the master node to the slave node. The slave side then sends a Calendar switch Acknowledge (CA) indication to the master node, and also sends a CR indication to the master node requesting a reconfiguration of the standby calendar for transmissions to the master node. Next, both the slave and master nodes follow the OIF FlexE Implementation Agreement to complete the calendar switch, including the master node sending a CA indication from to the slave node and, where one of the nodes wishes to switch the calendar configuration (A or B) in use, the master and slave nodes using the bit in the overhead indicating the calendar in use.

Figure 5:
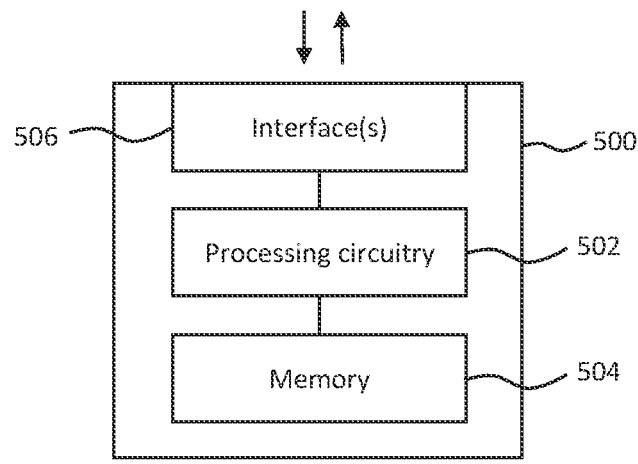
FIG. 5 is a schematic illustration of an example of apparatus for configuring a FlexE node.

FIG. 5 shows an example of apparatus 500 according to embodiments of the disclosure. The apparatus 500 may be an apparatus for configuring a first Flex Ethernet (FlexE) node. The apparatus 500 may be configured to perform the method 400 of FIG. 4.

The apparatus 500 comprises processing circuitry 502 (e.g. one or more processors) and a memory 504 in communication with the processing circuitry 502. The memory 504 contains instructions executable by the processing circuitry 502. The apparatus 500 also comprises an interface (or interfaces) 506 in communication with the processing circuitry 502 and for communicating with nodes of the communications system. Although the interface 506, processing circuitry 502 and memory 504 are shown connected in series, these may alternatively be interconnected in any other way, for example via a bus.

In one embodiment, the memory 504 containing instructions executable by the processing circuitry 502 such that the apparatus is operable to receive first data from a second FlexE node in time slots over at least one physical layer connection, the first data including overhead identifying assignments of the time slots to one or more client flows in the first data, and assign time slots for transmission of second data to the second FlexE node based on the assignments of time slots in which the first data is received.

In some examples, the second data includes one or more additional client flows, each of the one or more additional client flows corresponding to a respective one of the one or more client flows from the second node to the first node. In some examples, the memory contains instructions executable by the processing circuitry such that the apparatus is operable to assign time slots for transmission of second data to the second FlexE node by, for each assignment of a time slot in which the first data is received to one of the one or more client flows, assigning the same time slot in for transmission of the second data to the corresponding additional client flow. Assigning time slots for transmission of second data to the second FlexE node may comprise determining an assignment of a time slot in the first data to one of the one or more client flows in the first data and assigning the same time slot in the second data to the corresponding additional client flow. The memory may also contain instructions executable by the processing circuitry such that the apparatus is operable to receive an update of the assignments of the time slots in which the first data is received to the one or more client flows and/or one or more additional client flows, and assign time slots for transmission of the second data to the second FlexE node based on the update.

Figure 6:
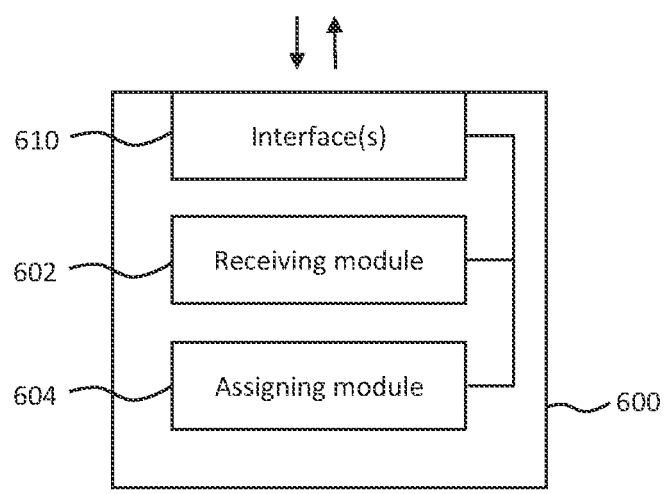
FIG. 6 is a schematic illustration of an example of another apparatus for configuring a FlexE node.

FIG. 6 shows an example of an apparatus 600 for configuring a first Flex Ethernet (FlexE) node. The apparatus 600 comprises a receiving module 602 configured to receive first data from a second FlexE node in time slots over at least one physical layer connection, the first data including overhead identifying assignments of the time slots in the first data to one or more client flows in the first data. The apparatus 600 also comprises an assigning module 604 configured to assign time slots for transmission of second data to the second FlexE node based on the assignments of time slots in which the first data is received. The apparatus 600 may also comprise an interface (or interfaces) 610 in communication with one or more of the modules 602 and/or 604 and for communicating with nodes of the communications system. In the embodiment illustrated in FIG. 6 the interface as well as receiving and assigning modules are connected to a bus, however, other architectures of the apparatus, 600, are also possible and would be envisaged by those skilled in the art. For example, the modules and interface could be connected in series.

In one embodiment of the present invention a FlexE node comprises an apparatus as described above with reference to FIGS. 5 and 6. In alternative embodiments the apparatus for configuring a FlexE may not be comprised in the FlexE node.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of configuring a first Flex Ethernet (FlexE) node, the method comprising the first FlexE node assigning timeslots for sending of second data, by the first FlexE node to a second FlexE node, based on assignments of time slots in which the first FlexE node received first data from the second FlexE node.

2. The method of claim 1, wherein:
the assignments of time slots in which the first FlexE node received first data from the second FlexE node are based on a calendar configuration, and
the method further comprises configuring a multiplexer of the first FlexE node to send the second data over the FlexE group using a configuration that is based on the calendar configuration for the received first data.

3. The method of claim 1,
further comprising transmitting the second data to the second FlexE node according to the assigned time slots for sending of the second data.

4. The method of claim 3, wherein the first data is received in time slots over at least one physical layer connection and the second data is transmitted in time slots over at least one physical layer connection.

5. The method of claim 3, wherein the time slots in which the first data is received and the time slots in which the second data is transmitted are recurring time slots.

6. The method of claim 1, wherein the second data includes one or more additional client flows corresponding to respective one or more client flows from the second node to the first node.

7. The method of claim 6, wherein assigning timeslots for sending of second data comprises, for each assignment of a time slot in which the first data of a particular client flow is received, assigning a same time slot for sending of the second data of the additional client flow corresponding to the particular client flow.

8. The method of claim 6, wherein assigning timeslots for sending of second data comprises determining that a time slot in the first data is assigned to a particular client flow and assigning a same time slot in the second data to an additional client flow that corresponds to the particular client flow.

9. The method of claim 6, wherein:
the method further comprises receiving an update of the assignments of the time slots in which the first data is received to the one or more client flows and/or one or more additional client flows; and
assigning timeslots for sending of second data comprises assigning time slots for sending of the second data to the second FlexE node based on the update.

10. A non-transitory, computer-readable medium storing computer-executable instructions that, when executed by processing circuitry of a first Flex Ethernet (FlexE) node, cause the first FlexE node to perform operations corresponding to the method of claim 1.

11. Apparatus arranged to configure a first Flex Ethernet (FlexE) node, the apparatus comprising:
processing circuitry; and
a memory storing instructions executable by the processing circuitry, wherein execution of the instructions cause the apparatus to:
assign timeslots for sending of second data, by the first FlexE node to a second FlexE node, based on assignments of time slots in which the first FlexE node received first data from the second FlexE node.

12. The apparatus of claim 11, wherein:
assignments of time slots in which the first FlexE node received first data from the second FlexE node are based on a calendar configuration; and
execution of the instructions further cause the apparatus to configure a multiplexer of the first FlexE node to send the second data over the FlexE group using a configuration that is based on the calendar configuration for the received first data.

13. The apparatus of claim 11, wherein:
execution of the instructions further cause the apparatus to transmit the second data to the second FlexE node according to the assigned time slots for sending of the second data.

14. The apparatus of claim 13, wherein the first data is received in time slots over at least one physical layer connection and the second data is transmitted in time slots over at least one physical layer connection.

15. The apparatus of claim 13, wherein the time slots in which the first data is received and the time slots in which the second data is transmitted are recurring time slots.

16. The apparatus of claim 11, wherein the second data includes one or more additional client flows corresponding to respective one or more client flows from the second node to the first node.

17. The apparatus of claim 16, wherein execution of the instructions cause the apparatus to assign timeslots for sending of second data based on, for each assignment of a time slot in which the first data of a particular client flow is received, assigning a same time slot for sending of the second data of the additional client flow corresponding to the particular client flow.

18. The apparatus of claim 16, wherein execution of the instructions cause the apparatus to assign timeslots for sending of second data based on determining that a time slot in the first data is assigned to a particular client flow and assigning a same time slot in the second data to an additional client flow that corresponds to the particular client flow.

19. The apparatus of claim 16, wherein:
execution of the instructions further cause the apparatus to receive an update of the assignments of the time slots in which the first data is received to the one or more client flows and/or one or more additional client flows; and
execution of the instructions cause the apparatus to assign timeslots for sending of second data based on assigning time slots for sending of the second data to the second FlexE node based on the update.

20. A Flex Ethernet (FlexE) node comprising the apparatus of claim 11.

* * * * *